(12) United States Patent
Shetty et al.

(10) Patent No.: US 10,192,330 B2
(45) Date of Patent: Jan. 29, 2019

(54) RENDERING DATA VISUALIZATIONS IN DIFFERENT ANALYTICAL APPLICATIONS

(71) Applicant: SAP SE, Walldorf (DE)

(72) Inventors: Arpitha A Shetty, Bangalore (IN);
Amrita Prabhakaran, Bangalore (IN);
Swetha Konduru, Bangalore (IN);
Swati Krishna Setty, Bangalore (IN);
Soumya Patil, Bangalore (IN)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 14/958,934

(22) Filed: Dec. 4, 2015

(65) Prior Publication Data
US 2017/0161926 A1 Jun. 8, 2017

(51) Int. Cl.
*G06T 11/20* (2006.01)
*G06Q 10/00* (2012.01)

(52) U.S. Cl.
CPC ............ *G06T 11/206* (2013.01); *G06Q 10/00* (2013.01)

(58) Field of Classification Search
CPC ..................................... G06T 11/206
See application file for complete search history.

(56) References Cited

U.S. PATENT DOCUMENTS

| | | | |
|---|---|---|---|
| 2005/0138631 A1* | 6/2005 | Bellotti .................. | G06Q 10/06 719/310 |
| 2006/0242325 A1* | 10/2006 | Ramaswamy ......... | H04H 20/95 709/246 |
| 2007/0061752 A1* | 3/2007 | Cory ....................... | G06F 9/543 715/804 |
| 2007/0288888 A1 | 12/2007 | Gentry et al. | |
| 2009/0171790 A1* | 7/2009 | Nagarajayya .......... | G06Q 30/02 705/14.61 |
| 2012/0124478 A1* | 5/2012 | King ................. | G06F 17/30943 715/738 |
| 2014/0173411 A1* | 6/2014 | Sekharan ............ | G06F 17/2264 715/234 |
| 2014/0173412 A1* | 6/2014 | MacAulay .............. | G06F 21/60 715/234 |
| 2015/0324101 A1* | 11/2015 | Roesch ............... | G06F 3/04847 715/771 |
| 2016/0110812 A1* | 4/2016 | Mun ...................... | G06Q 40/06 705/36 R |
| 2016/0323249 A1* | 11/2016 | Duncker ............... | H04L 63/102 |

* cited by examiner

*Primary Examiner* — Phi Hoang
(74) *Attorney, Agent, or Firm* — Fish & Richardson P.C.

(57) ABSTRACT

Various embodiments of systems and methods to render data visualizations in different analytical applications are described herein. In one aspect, a request is received to render at least a portion of data visualization by an analytical application. A visualization type and one or more data attributes are retrieved from metadata corresponding to at least the portion of the data visualization. Further, a supporting visualization type is identified in the analytical application corresponding to the visualization type of at least the portion of the data visualization. The retrieved one or more data attributes are mapped to equivalent one or more data attributes in a data source associated with the analytical application. At least the portion of the data visualization is rendered based on the supporting visualization type and the mapped one or more data attributes in a graphical user interface of the analytical application.

20 Claims, 8 Drawing Sheets

RENDERING DATA VISUALIZATIONS IN DIFFERENT ANALYTICAL APPLICATIONS

FIELD

Embodiments generally relate to computer systems and more particularly to methods and systems to render data visualizations in different analytical applications.

BACKGROUND

Data visualization may assist in analyzing data to measure performance and to gain insight for future planning in an organization. The significance of data may be analyzed based on a way the data is presented. Further, data visualization may include presentation of the data in a visual context depicting patterns, trends and correlations that may go undetected in text-based data presentation. Different analytical applications are developed to provide different types of data visualizations via statistical graphics, plots, information graphics, tables and charts, and support unique visualization features.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to render data visualizations in different analytical applications are described herein. In the below description, numerous specific details are set forth to provide a thorough understanding of embodiments. One skilled in the relevant art will recognize, however that the embodiments can be practiced without one or more of the specific details or with other methods, components, techniques, etc. In other instance, well-known operations or structures are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. Situation where upon completion of the first step, a second step is executed. Such a situation will be specifically pointed out when not clear from the context. A particular step may be omitted. A particular step is required only when its omission would materially impact another step.

In this document, various computer-implemented methods, processes and procedures are described. It is to be understood that the various actions (retrieving, identifying, mapping, storing, rendering, etc.) are performed by a hardware device (e.g., computing system), even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted.

Figure 1:
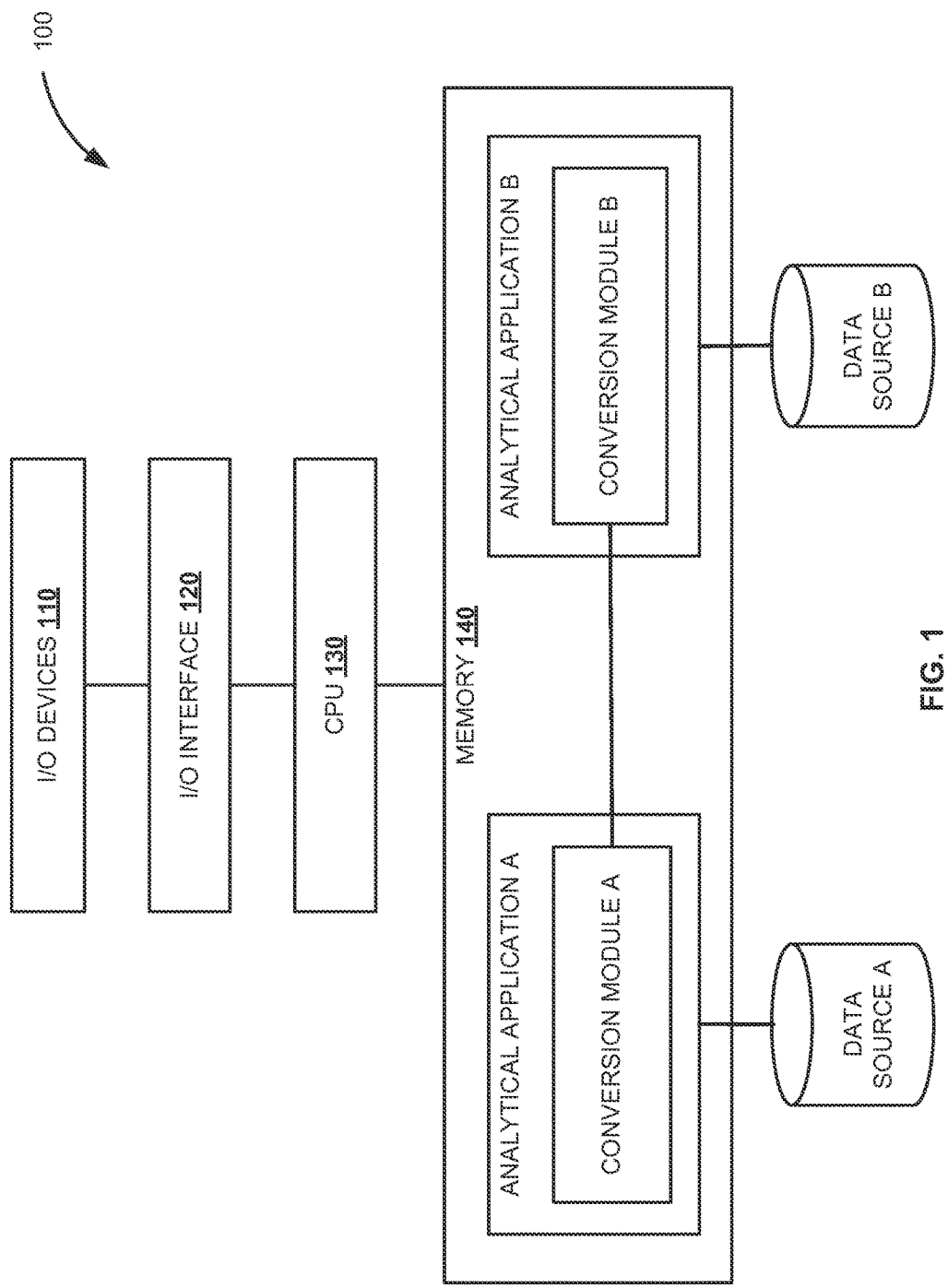
FIG. 1 is a block diagram illustrating an example of a computing system in which an environment described herein may be implemented, according to an embodiment.

FIG. 1 is a block diagram illustrating an example of computing system 100 in which an environment described herein may be implemented, according to an embodiment. The computing system 100 can be a machine capable of performing configured operations. The computing system can be, but not limited to a desktop computer, a laptop computer, a cellular telephone, or an appropriate combination of two or more of such devices or other data processing devices, that is capable of executing analytical applications.

The computing system 100 may include one or more input/output (I/O) devices 110 for a user to interact with the computing system 100 (e.g., for the user to enter input for an application execution and/or for the computing system 100 to provide results of the execution) using I/O interface 120. The 10 interface 120 provides a mechanism to transfer information between the I/O devices 110 and central processing unit (CPU) 130 of the computing system 100.

The CPU 130 can be in electronic communication with a non-transitory computer-readable storage medium (e.g., memory 140) through a high speed memory bus, for instance. In one exemplary embodiment, the computer-readable storage medium stores program code. Further, the code may be configured to reference data stored in a database, e.g., on the non-transitory computer-readable storage medium. The CPU 130 executes the instructions stored in the memory 140 by accessing relevant data stored one or more data stores (e.g., data source A and data source B).

In one embodiment, the memory 140 includes program code associated with different analytical applications (e.g., analytical application A and analytical application B). An analytical application (e.g., the analytical application A and the analytical application B) is a set of computer programs designed to perform a group of coordinated functions, tasks, or activities. For example, the analytical application (e.g., the analytical application A and the analytical application B) can be used to construct or build or generate data visualizations to represent data. The data visualizations can be, but not limited to infographics, dials and gauges, geographic maps, sparklines, heat maps, and charts such as bar charts, pie charts and fever charts. Further, the data visualization may include interactive capabilities such as, but not limited to enabling to manipulate data or drill into the data for querying and analysis.

In one embodiment, the analytical applications may include corresponding conversion modules (e.g., conversion module A associated with the analytical application A and conversion module B associated with the analytical application B). The conversion modules (e.g., conversion module A and conversion module B) can be plugins or modules of computer program instructions to support rendering data visualizations in different analytical applications (e.g., the analytical application A and the analytical application B). For example, data visualization initially generated by the analytical application A is rendered in the analytical application B using the conversion modules (e.g., conversion module A and conversion module B) to include features supported in the analytical application B. Therefore, with the conversion modules (e.g., conversion module A and conversion module B), the analytical applications (e.g., the analytical application A and the analytical application B) may have interoperability to reuse the data visualization in different analytical applications without regenerating the data visualization.

Figure 2:
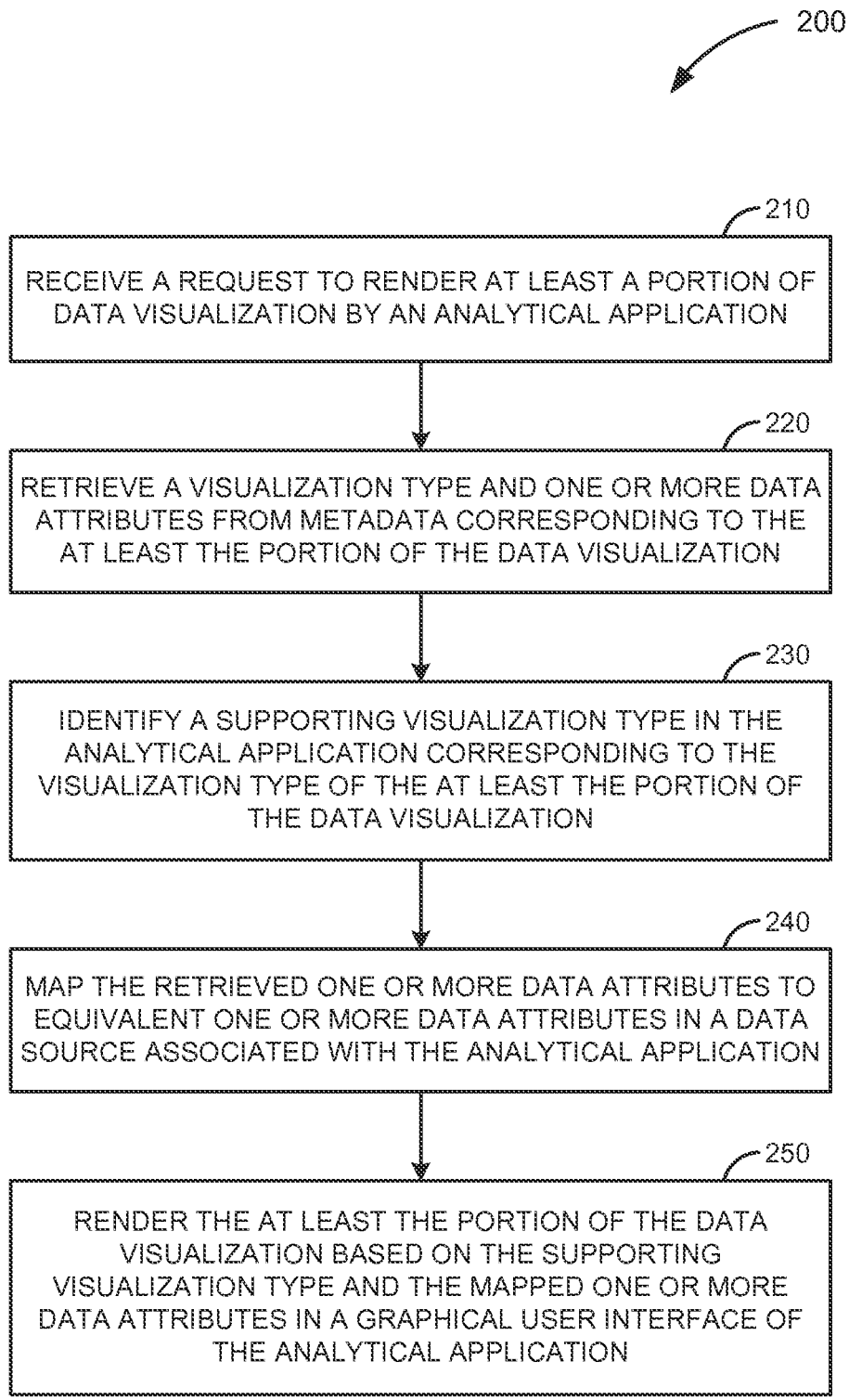
FIG. 2 is a flow diagram illustrating an example process to render data visualization in different analytical applications, according to an embodiment.

FIG. 2 is a flow diagram illustrating example process 200 to render data visualization in different analytical applications, according to an embodiment. The process 200 can be implemented in the analytical applications, which enables generating different types of data visualizations for analyzing data. For example, the analytical application can be, but are not limited to Webi*®, Crystal Reports®, Design Studio® and Lumira® of SAP SE. To describe the process 200, an example is considered where the data visualization is generated in an analytical application A. Further, the data visualization is copied from the analytical application A and pasted in an analytical application B to render the data visualization in the analytical application B. Thereby, the data visualization can include features supported by the analytical application B.

At 210, a request is received to render at least a portion of data visualization by an analytical application (e.g., the analytical application B). Receiving the request may include receiving a "paste visualization" command in the analytical application (e.g., the analytical application B). In one exemplary embodiment, prior to receiving the request to render the portion of the data visualization in the analytical application (e.g., the analytical application B), the data visualization is copied from another analytical application (e.g., the analytical application A). In one exemplary embodiment, graphical user interfaces (GUIs) associated with the analytical applications (e.g., the analytical application A and the analytical application B) provide options to copy the data visualization from one analytical application and paste the copied data visualization in another analytical application.

In one exemplary embodiment, entirety of the data visualization or at least the portion of the data visualization can be copied. For example, the portion of the data visualization can be, but not limited to filtered graph based on data attributes, drilled down graph to different hierarchy and selected columns/bars or portions of charts that a user is interested in. Further, copying the data visualization from the analytical application (e.g., the analytical application A) includes converting a format of metadata associated with the data visualization to a pre-defined format such as, but not limited to JavaScript Object Notation (JSON), EXtensible Markup Language (XML). Further, the metadata is copied on a clipboard, for instance. An example metadata is depicted in Table 1.

TABLE 1

| Field | Significance | Example |
| --- | --- | --- |
| type | Kind of chart being used. | Info/bar |
| family_type | Family to which the chart belongs to | Bar chart |
| measures | Name of the fields acting as measures. | SepalLength |
| measures_type | Data type of the measures. | Integer |
| dimensions_name | Name of the fields acting as dimensions. | Species |
| dimensions_type | Data type of the dimension | String |
| hierarchy | Number of hierarchy present in the graph (e.g., Geo maps) | 2: Country 1: State |
| filter | If the graph is filtered based on a field. | Species = "versicolor" |
| formula | Formulas used like running calculations and the like | Average (PetalWidth) |

At 220, a visualization type and one or more data attributes are retrieved from the metadata corresponding to the portion of the data visualization. Prior to retrieving, the pre-defined format of the metadata is converted to a supporting format corresponding to the analytical application (e.g., the analytical application B). The visualization type can be, but not limited to an infographic, a dial and gauge, a geographic map, a sparkline, a heat map, and a detailed bar, pie and fever chart. Further, the data visualization may include interactive capabilities, enabling to manipulate the data visualization or drill (e.g., hierarchy) into the data for querying and analysis. The data attributes defines, but not limited to measures, dimensions and data types associated with the data visualization.

At 230, a supporting visualization type is identified in the analytical application (e.g., the analytical application B), corresponding to the visualization type of the portion of the data visualization. When the supporting visualization type is not present in the analytical application, an option is provided to select a data visualization family type. In other words, when the supporting visualization type is not identified, depending on data visualization family type information present in the metadata, a suggestion is provided to select one of the type of data visualization supported by the analytical application (e.g., the analytical application B), which has a common family type. For example, when the portion of the data visualization includes a geo bubble chart and the geo bubble chart is not supported by the analytical application (e.g., the analytical application B), one or more charts (e.g., geo choropleth chart, geo pie chart and the like) belonging to a family type of the geo bubble chart is prompted to a user for selecting desired chart. Table 2 depicts examples of different types of visualization data and associated family types.

TABLE 2

| Family Type | Type of data visualization |
| --- | --- |
| Bar and column charts | Bar charts<br>Columns charts<br>Stacked bar charts<br>Stacked column charts<br>Bar chart with 2 X axis<br>Column chart with 2 Y axis |

TABLE 2-continued

| Family Type | Type of data visualization |
|---|---|
| | 3D Column chart |
| | 100% Marimekko chart |
| Line chart | Line chart |
| | Line chart for date/time series |
| | Area chart |
| | Combined column line chart |
| | Combined stacked line chart |
| | Line chart with 2 Y-Axes |
| | Combined column line chart with 2 Y-Axes |
| | Combined stacked line chart with 2 Y-Axes |
| Pie Chart | Pie chart |
| | Donut chart |
| | Pie with Depth chart |
| Geographic charts | Geo bubble chart |
| | Geo Choropleth chart |
| | Geo pie chart |
| | Geo Map |
| Scatter Charts | Scatter Ploy |
| | Bubble Chart |
| | Scatter Matrix Chart |
| Map charts | Heat Map |
| | Tree Map |
| Tables | Crosstab |
| Point Chart | Numeric points |

At 240, the retrieved one or more data attributes are mapped to equivalent one or more data attributes in a data source associated with the analytical application (e.g., analytical application B). When the equivalent data source is present, the data attributes such as chart measures and dimensions are mapped to the equivalent data source by comparing the name of measure and dimensions, and the data type of measures/dimensions. When the data source is not present, a prompt is provided for the user to enter a new data source for mapping. On the other hand, when the data mapping fails, the user is prompted with a warning message and provides an option for manual mapping of the data source. Further, the metadata is merged with the mapped data.

At 250, at least the portion of the data visualization is rendered based on the supporting visualization type and the mapped one or more data attributes on a graphical user interface (GUI) of the analytical application (analytical application B).

In one exemplary embodiment, rendering the portion of the data visualization includes providing an option for rendering data hierarchy associated with the data visualization, for instance. For any hierarchical information, where drill up/down is possible, the metadata includes the level of hierarchies. Thereby when the data visualization is pasted, a drilled down visualization and/or drilled up data visualization can be displayed using the metadata. Therefore, the data visualization can be reused along with the properties such as, but are not limited to zoom, drill and filters without regenerating the data visualization. Also, the described process can be installed in any new application and across the different versions of the application. The process described above is not limited to embodiments that solve any disadvantages or that operate only in environments such as those described above. Further, the above described process for achieving rendering of different types of data visualization in different applications.

Figure 3:
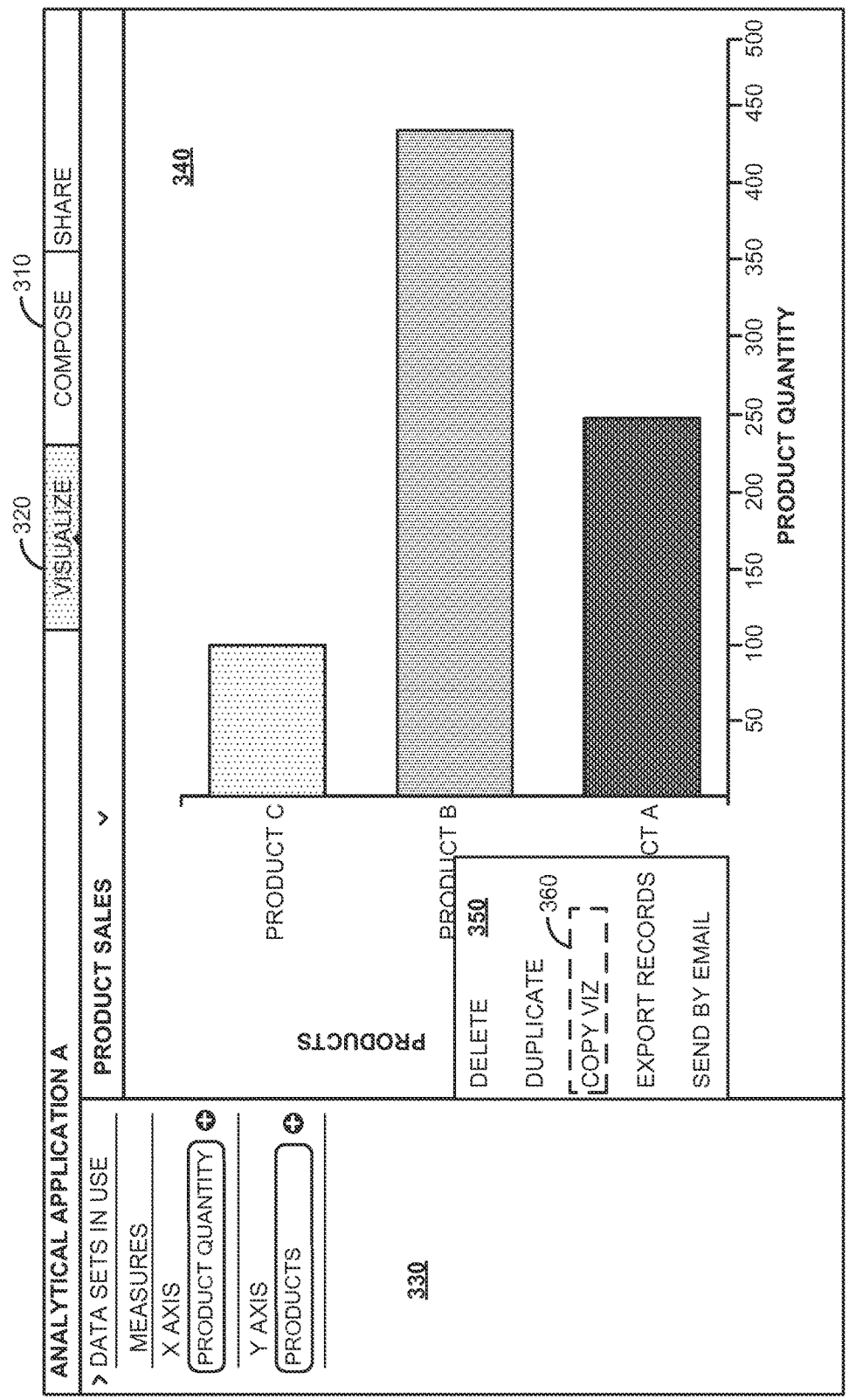
FIG. 3 is an exemplary graphical user interface of an analytical application, according to an embodiment.

FIG. 3 is an exemplary graphical user interface (GUI) of an analytical application (e.g., analytical application A), according to an embodiment. The GUI includes options to compose or generate data visualization (e.g., 310) and to visualize or display the generated data visualization (e.g., 320). Further, the GUI includes multiple portions. One portion (e.g., 330) may include data attributes associated with the data visualization. Another portion (e.g., 340) may display the generated data visualization. For example, the portion 340 includes a bar chart depicting sales report of different products.

In one exemplary embodiment, the GUI includes a portion (e.g., 350) for performing different actions such as, but not limited to "delete", "duplicate", "export records", "copy viz" and "send by email." The option "copy viz" 360 enables to copy the data visualization displayed in the portion 340, which can be displayed in another analytical application (e.g., analytical application B) using conversion modules associated with the analytical application A and the analytical application B. In one exemplary embodiment, entirety of the data visualization or a portion of the data visualization can be copied. Upon receiving a request to copy the data visualization, metadata associated with the data visualization is converted to a pre-defined format and the metadata is copied to a clipboard, for instance.

Figure 4:
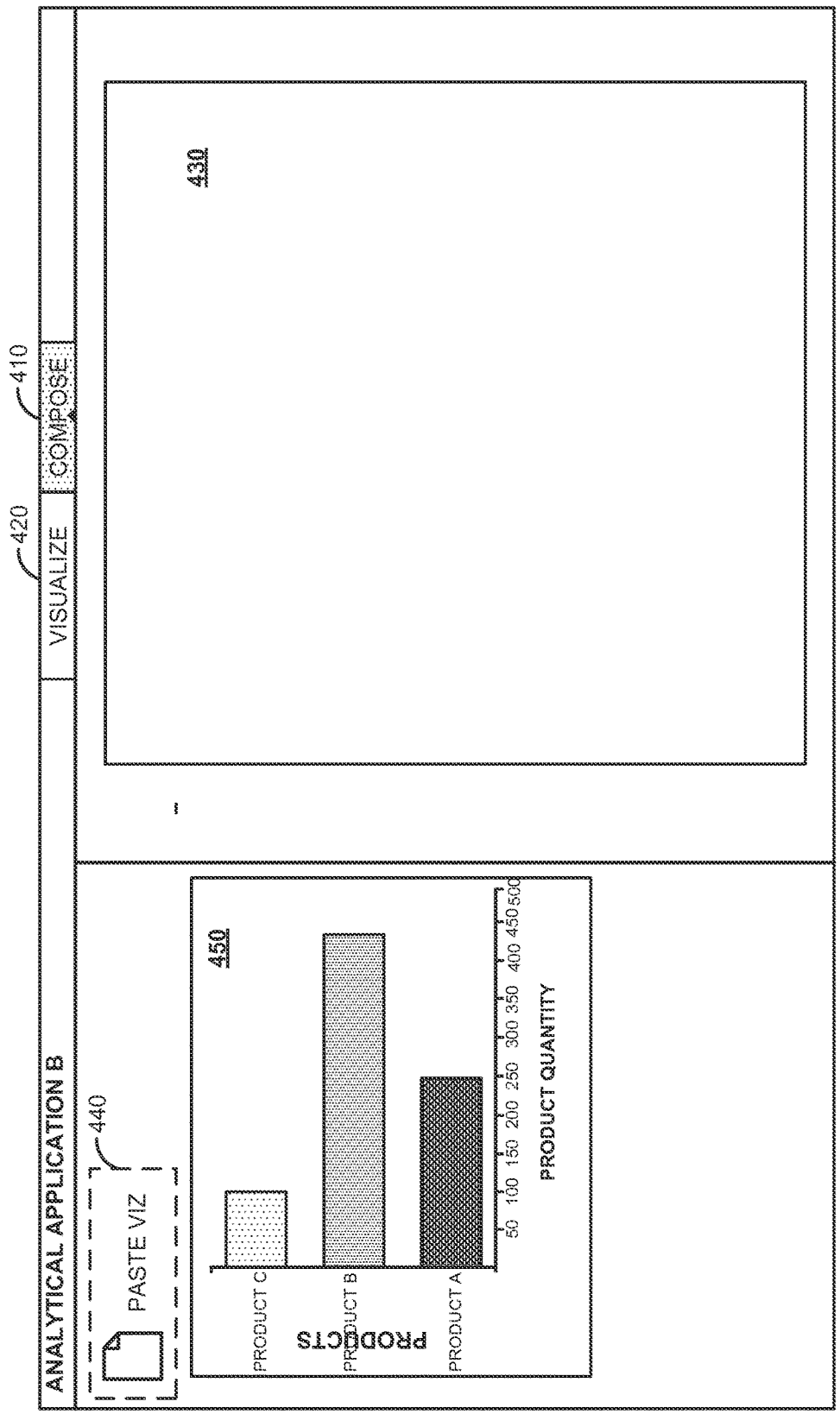
FIG. 4 is an exemplary graphical user interface of an analytical application, according to an embodiment.

FIG. 4 is an exemplary graphical user interface (GUI) of an analytical application (e.g., analytical application B), according to an embodiment. The GUI includes options to compose or generate data visualization (e.g., 410) and to visualize or display the generated data visualization (e.g., 420). Further, the GUI includes multiple portions. One portion (e.g., 430) may include a canvas for generating the data visualization. In one exemplary embodiment, the GUI includes an option "paste viz" (e.g., 440) to paste the data visualization (e.g., data visualization displayed in portion 340 of FIG. 3) copied from another analytical application (e.g., analytical application A). Upon receiving a request to render the data visualization copied from another analytical application, a process described in FIG. 2 is executed and the data visualization is rendered on a portion (e.g., 450) the GUI of the analytical application B. For example, a supporting visualization type (e.g., bar chart) is identified in the analytical application B. Further, the one or more data attributes (e.g., products and product quantity) are mapped to equivalent one or more data attributes in a data source associated with the analytical application B. Based on the supporting visualization type and the mapped data attributes, the data visualization is rendered on the portion 450. In one exemplary embodiment, the data visualization displayed on the portion 450 can be dragged to the canvas 430 (e.g., used for generating the data visualization at the analytical application B) to modify the data visualization to include additional features supported by the analytical application B.

Figure 5A:
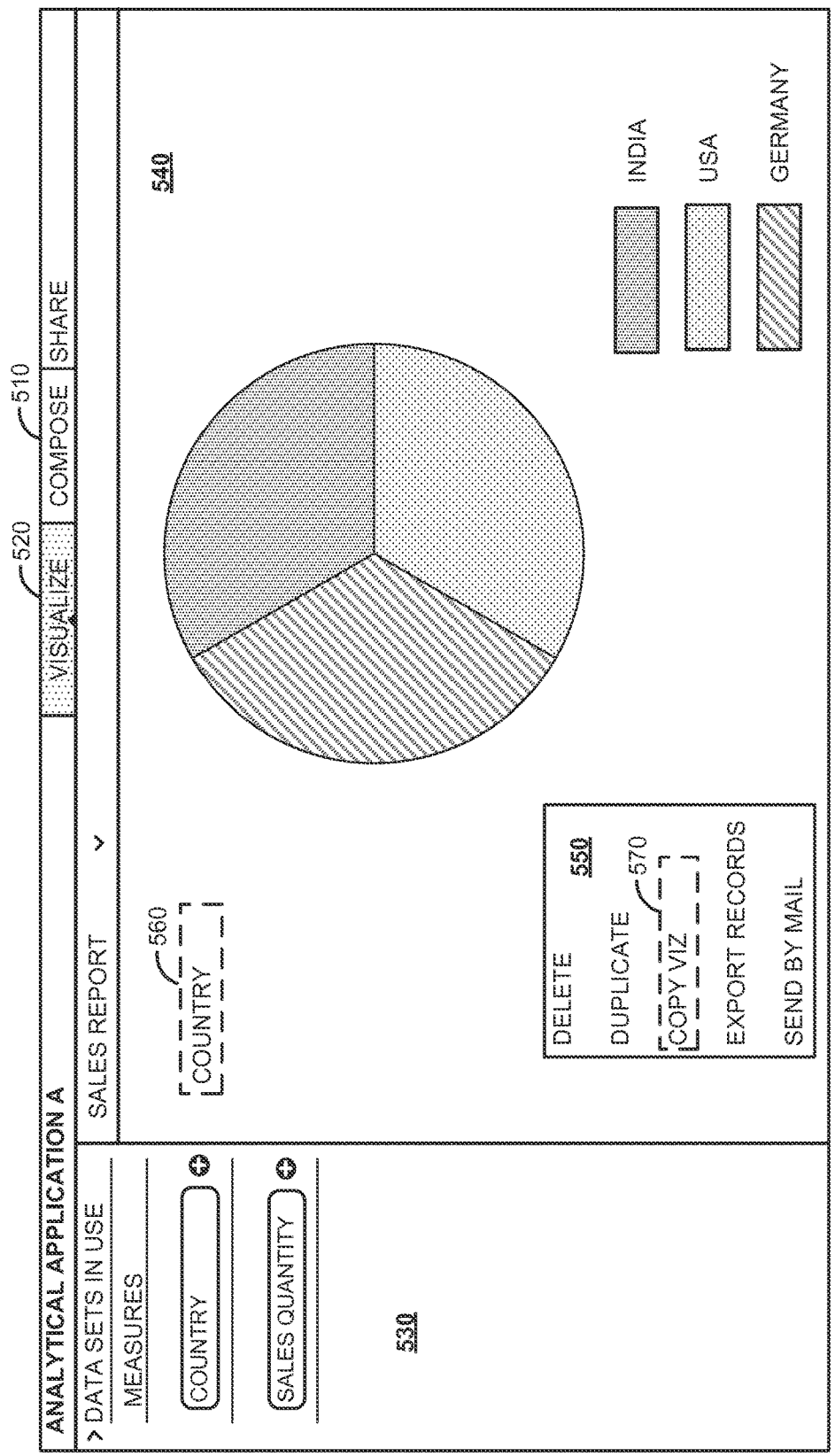
FIG. 5A is exemplary graphical user interface of an analytical application, according to an embodiment.

FIG. 5A is exemplary graphical user interface of an analytical application (e.g., analytical application A), according to an embodiment. In FIG. 5A, the GUI includes options to compose or generate data visualization (e.g., 510) and visualize the generated data visualization (e.g., 520). Further, the GUI includes multiple portions. One portion (e.g., 530) may include data attributes associated with the data visualization. Another portion (e.g., 540) may display the generated data visualization. For example, the portion 540 includes a pie chart depicting sales in different countries (e.g., "India", "USA" and "Germany"). In one exemplary embodiment, the GUI includes a portion (e.g., 550) for performing different actions such as, but not limited to "delete", "duplicate", "export records", "copy viz" and "send by email." The data visualization (e.g., pie chart) displayed in the portion 540 includes different data hierarchy (e.g., 560).

Figure 5B:
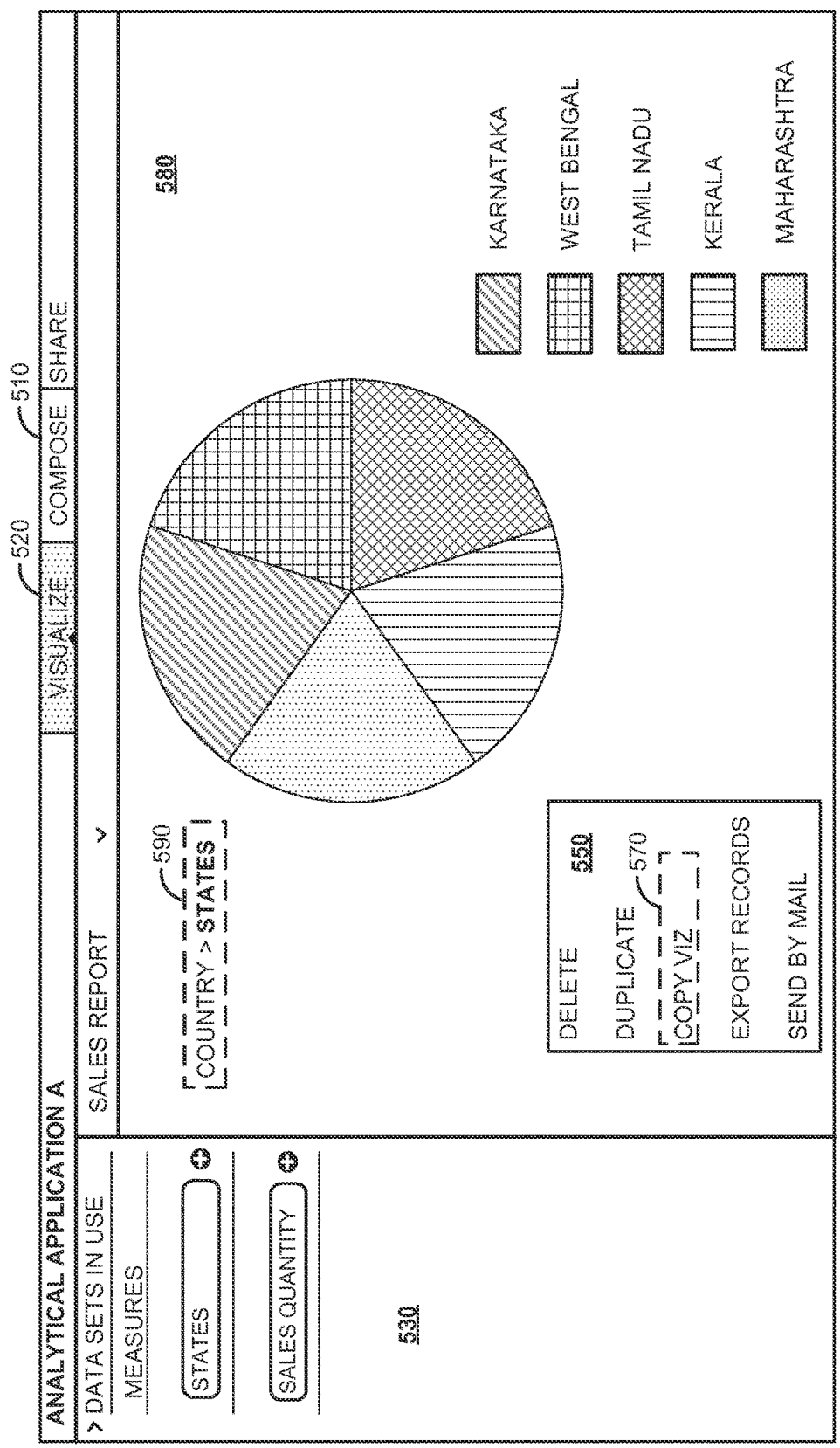
FIG. 5B is exemplary graphical user interface of an analytical application, according to an embodiment.

FIG. 5B is exemplary graphical user interface of an analytical application (e.g., analytical application A), according to an embodiment. The data visualization (e.g., pie chart) displayed in the portion 540 of FIG. 5A includes different data hierarchy (e.g., 560 of FIG. 5A and 590 of FIG. 5B). When a user desire to visualize sales report pertaining to states associated with a country through actions such as, but not limited to zooming a desired country and double clicking on the country, data pertaining to the states can be displayed. For example, the data pertaining to states (e.g., "Karnataka", "West Bengal", "Tamil Nadu", "Kerala" and "Maharashtra") associated with country "India" is displayed in portion 580 of FIG. 5B.

In one exemplary embodiment, an option "copy viz" 570 enables to copy the data visualization displayed in the portion 540 of FIG. 5A or the portion 580 of FIG. 5B, which can be displayed in another analytical application (e.g., analytical application B) using conversion modules associated with the analytical application A and the analytical application B.

Figure 6:
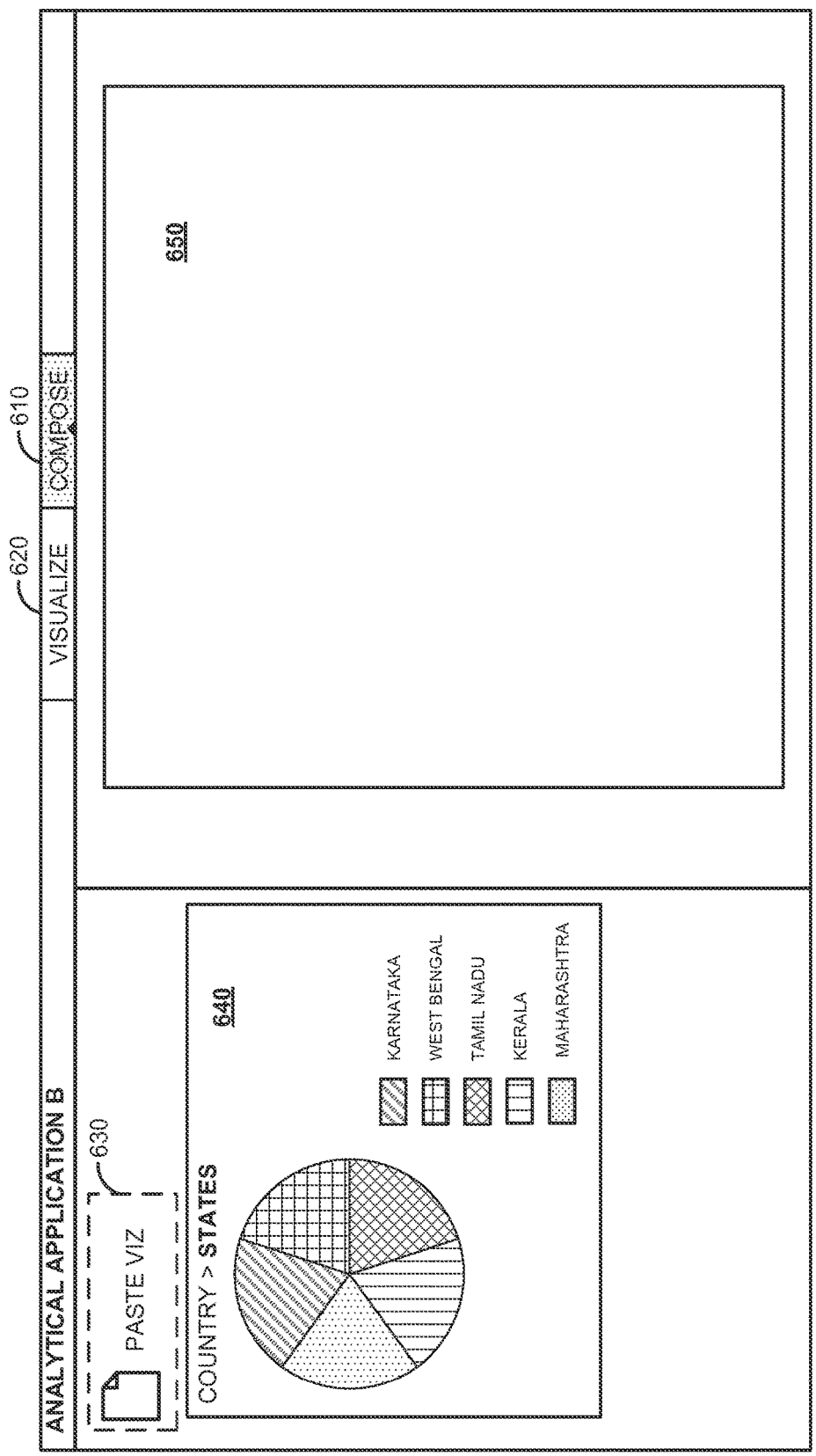
FIG. 6 is an exemplary graphical user interface of an analytical application, according to an embodiment.

FIG. 6 is an exemplary graphical user interface (GUI) of an analytical application B, according to an embodiment. The GUI includes options to compose or generate data visualization (e.g., 610) and visualize the generated data visualization (e.g., 620). Further, the GUI includes multiple portions. One portion (e.g., 650) may include a canvas for generating the data visualization. In one exemplary embodiment, the GUI includes an option "paste viz" (e.g., 630) to paste the data visualization (e.g., data visualization displayed in portion 580 of FIG. 5B) copied from another analytical application (e.g., analytical application A). Upon receiving a request to render the data visualization copied from another analytical application, a process described in FIG. 2 is executed and the data visualization is rendered on a portion (e.g., 640) of the GUI of the analytical application B. Further, the data hierarchy (e.g., 590 of FIG. 5B) associated with the data visualization can be rendered on the GUI of the analytical application B by performing actions such as drilled down or up as the data hierarchy information is available in metadata. In the example, the sales report pertaining to different countries can be rendered even though the sales report pertaining to different states of a country is copied from the analytical application A.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computing system that is remotely located from a second computing system containing an interface level (e.g., a graphical user interface). These first and second computing systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computing system which causes the computing system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
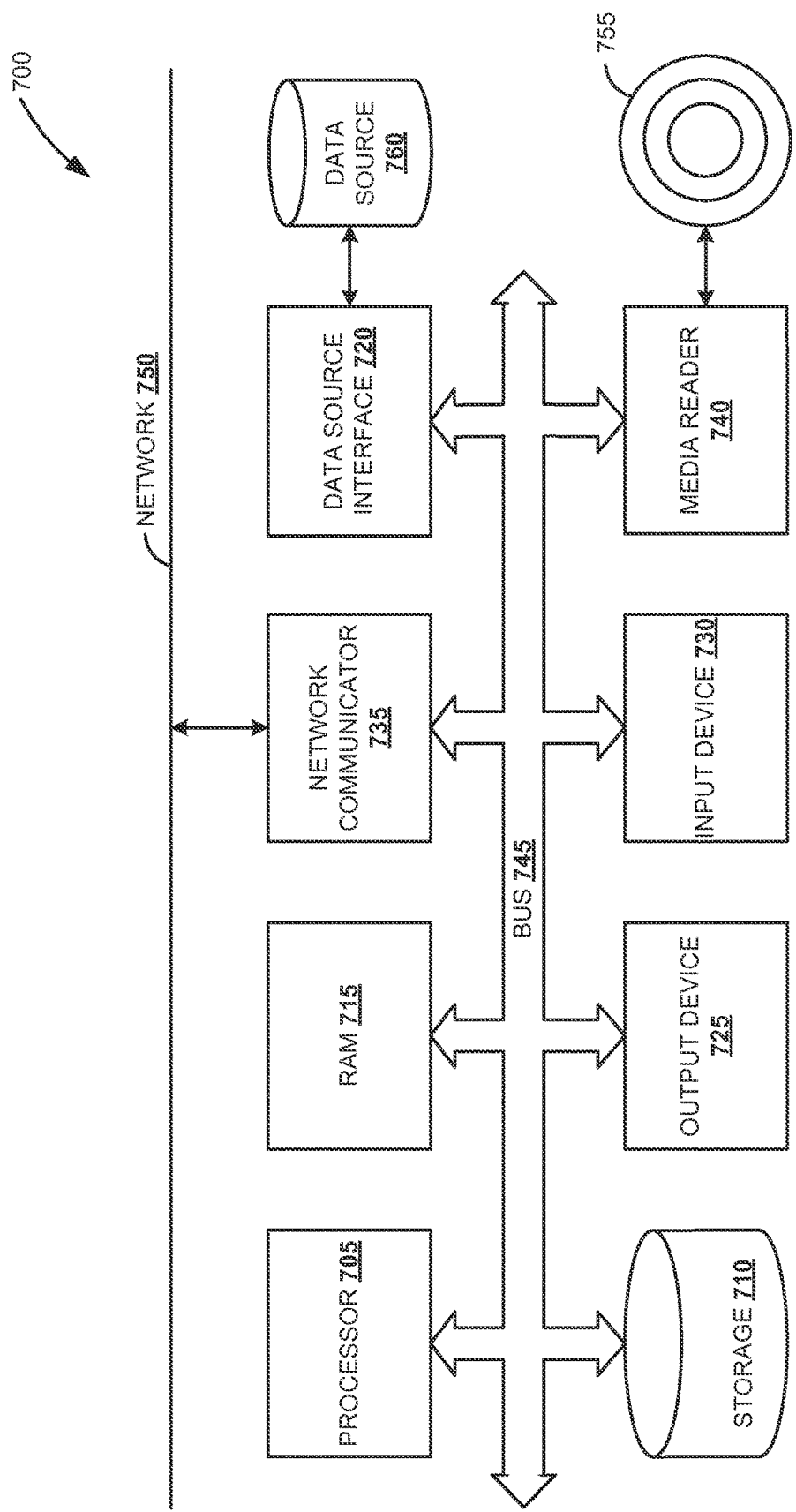
FIG. 7 is a block diagram of an example computing system, according to an embodiment.

FIG. 7 is a block diagram of example computing system 700, according to an embodiment. The computing system 700 includes a processor 705 that executes software instructions or code stored on a computer readable storage medium 755 to perform the above-illustrated methods. The processor 705 can include a plurality of cores. The computing system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computing system 700 further includes an output device 725 (e.g., a display) to provide at least some of the results of the execution as output including, but not limited to, visual information to users and an input device 730 to provide a user or another device with means for entering data and/or otherwise interact with the computing system 700. One or more of these output devices 725 and input devices 730 could be joined by one or more additional peripherals to further expand the capabilities of the computing system 700. A network communicator 735 may be provided to connect the computing system 700 to a network 750 and in turn to other devices connected to the network 750 including other clients, servers, data stores, and interfaces, for instance. The modules of the computing system 700 are interconnected via a bus 745. Computing system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to:
    copy, from a first analytical program, at least a portion of a data visualization that is generated by the first analytical application based on data in a first data source associated with the first analytical application, wherein the copying includes converting metadata corresponding to at least the portion of the data visualization from a first metadata format associated with the first analytical application to a pre-defined metadata format;
    after converting the metadata from the first metadata format to the pre-defined metadata format, receive a request to render at least the portion of a data visualization in a second analytical application and, based on the request, determine a second metadata format associated with the second analytical application, wherein the second metadata format is undetermined when the portion of the data visualization is copied and the metadata is converted to the pre-defined format, and wherein the pre-defined metadata format is different than the first metadata format and the second metadata format;
    convert the metadata from the pre-defined metadata format to the second metadata format associated with the second analytical application;
    retrieve, from the converted metadata in the second metadata format, a visualization type and one or more data attributes-corresponding to at least the portion of the data visualization;
    identify a supporting visualization type in the second analytical application corresponding to the visualization type of at least the portion of the data visualization;
    map the retrieved one or more data attributes to equivalent one or more data attributes in a second data source associated with the second analytical application; and
    render at least the portion of the data visualization in a graphical user interface of the second analytical application, wherein the graphical user interface of the second analytical application provides, based on the supporting visualization type and the mapped one or more data attributes, interactive capabilities to manipulate at least the portion of the data visualization.

2. The non-transitory computer-readable medium of claim 1, wherein receiving the request comprises receiving a paste visualization command in the second analytical application.

3. The non-transitory computer-readable medium of claim 1, wherein the copying of at least the portion of the data visualization is performed prior to receiving the request to render at least the portion of the data visualization.

4. The non-transitory computer-readable medium of claim 1, wherein the pre-defined metadata format is one or more of JavaScript Object Notation (JSON) and EXtensible Markup Language (XML).

5. The non-transitory computer-readable medium of claim 1, wherein the copying of at least the portion of the data visualization further includes copying the metadata in the pre-defined metadata format to a clipboard.

6. The non-transitory computer-readable medium of claim 1, wherein when the supporting visualization type is not present in the second analytical application, an option is provided to select a data visualization family type.

7. The non-transitory computer-readable medium of claim 1, wherein rendering at least the portion of the data visualization comprises providing an option for rendering data hierarchy associated with the data visualization.

8. A computer implemented method for providing data visualizations in different analytical applications, comprising:
    copying, from a first analytical program, at least a portion of a data visualization that is generated by the first analytical application based on data in a first data source associated with the first analytical application, wherein the copying includes converting metadata corresponding to at least the portion of the data visualization from a first metadata format associated with the first analytical application to a pre-defined metadata format;
    after converting the metadata from the first metadata format to the pre-defined metadata format, receiving a request to render at least the portion of a data visualization in a second analytical application and, based on the request, determining a second metadata format associated with the second analytical application, wherein the second metadata format is undetermined when the portion of the data visualization is copied and the metadata is converted to the pre-defined format, and wherein the pre-defined metadata format is different than the first metadata format and the second metadata format;

converting the metadata from the pre-defined metadata format to a second metadata format associated with the second analytical application;

retrieving, from the converted metadata in the second metadata format, a visualization type and one or more data attributes corresponding to at least the portion of the data visualization;

identifying a supporting visualization type in the second analytical application corresponding to the visualization type of at least the portion of the data visualization;

mapping the retrieved one or more data attributes to equivalent one or more data attributes in a second data source associated with the second analytical application; and rendering at least the portion of the data visualization in a graphical user interface of the second analytical application, wherein the graphical user interface of the second analytical application provides, based on the supporting visualization type and the mapped one or more data attributes, interactive capabilities to manipulate at least the portion of the data visualization.

9. The computer implemented method of claim 8, wherein receiving the request comprises receiving a paste visualization command in the second analytical application.

10. The computer implemented method of claim 8, wherein the copying of at least the portion of the data visualization is performed prior to receiving the request to render at least the portion of the data visualization.

11. The computer implemented method of claim 8, wherein the pre-defined metadata format is one or more of JavaScript Object Notation (JSON) and EXtensible Markup Language (XML).

12. The computer implemented method of claim 8, wherein the copying of at least the portion of the data visualization further includes copying the metadata in the pre-defined metadata format to a clipboard.

13. The computer implemented method of claim 8, wherein rendering at least the portion of the data visualization comprises providing an option for rendering data hierarchy associated with the data visualization.

14. The computer implemented method of claim 8, wherein when the supporting visualization type is not present in the second analytical application, an option is provided to select a data visualization family type.

15. A computing system to render data visualizations in different analytical applications, comprising:
at least one processor; and
one or more memory devices communicative with the at least one processor, wherein the one or more memory devices store instructions to:
copy, from a first analytical program, at least a portion of a data visualization that is generated by the first analytical application based on data in a first data source associated with the first analytical application, wherein the copying includes converting metadata corresponding to at least the portion of the data visualization from a first metadata format associated with the first analytical application to a pre-defined metadata format;

after converting the metadata from the first metadata format to the pre-defined metadata format, receive a request to render at least the portion of a data visualization in a second analytical application and, based on the request, determine a second metadata format associated with the second analytical application, wherein the second metadata format is undetermined when the portion of the data visualization is copied and the metadata is converted to the pre-defined format, and wherein the pre-defined metadata format is different than the first metadata format and the second metadata format;

convert the metadata from the pre-defined metadata format to a second metadata format associated with the second analytical application;

retrieve, from the converted metadata in the second metadata format, a visualization type and one or more data attributes corresponding to at least the portion of the data visualization;

identify a supporting visualization type in the second analytical application corresponding to the visualization type of at least the portion of the data visualization;

map the retrieved one or more data attributes to equivalent one or more data attributes in a second data source associated with the second analytical application; and render at least the portion of the data visualization in a graphical user interface of the second analytical application, wherein the graphical user interface of the second analytical application provides, based on the supporting visualization type and the mapped one or more data attributes, interactive capabilities to manipulate at least the portion of the data visualization.

16. The computing system of claim 15, wherein receiving the request comprises receiving a paste visualization command in the second analytical application.

17. The computing system of claim 15, wherein the copying of at least the portion of the data visualization is performed prior to receiving the request to render at least the portion of the data visualization.

18. The computing system of claim 15, wherein the pre-defined metadata format is one or more of JavaScript Object Notation (JSON) and EXtensible Markup Language (XML).

19. The computing system of claim 15, wherein the copying of at least the portion of the data visualization further includes copying the metadata in the pre-defined metadata format to a clipboard.

20. The computing system of claim 15, wherein when the supporting visualization type is not present in the second analytical application, an option is provided to select a data visualization family type.

* * * * *